(12) United States Patent  
Wilsher et al.

(10) Patent No.: US 12,177,389 B1
(45) Date of Patent: Dec. 24, 2024

(54) METHOD AND APPARATUS TO VERIFY IMAGING POSITION ON A MULTI-FUNCTION DEVICE

(71) Applicant: Xerox Corporation, Norwalk, CT (US)

(72) Inventors: Michael John Wilsher, Hertfordshire (GB); Michael David Rodgers, Fairport, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 18/527,270

(22) Filed: Dec. 2, 2023

(51) Int. Cl.
*H04N 1/00* (2006.01)

(52) U.S. Cl.
CPC ..... *H04N 1/00087* (2013.01); *H04N 1/00005* (2013.01); *H04N 1/00029* (2013.01); *H04N 1/00968* (2013.01)

(58) Field of Classification Search
CPC ........... H04N 1/00087; H04N 1/00005; H04N 1/00029; H04N 1/00968; H04N 1/3878; H04N 2201/0081; H04N 1/00718; H04N 1/387; H04N 1/00045; H04N 1/00745; H04N 1/00588; H04N 1/193; H04N 1/401; H04N 1/4076; H04N 1/00785; H04N 2201/0091; H04N 2201/0098; H04N 1/00334; H04N 1/00363; H04N 1/04; H04N 1/0402; H04N 2201/044; H04N 1/00; H04N 1/00278; H04N 1/00482; H04N 1/00681; H04N 1/3877; H04N 1/40056; H04N 1/409; H04N 1/1013; H04N 1/12; H04N 1/2032; H04N 1/40; H04N 1/60; H04N 1/00002; H04N 1/00013; H04N 1/00082; H04N 1/00411; H04N 1/0044; H04N 1/02865; H04N 1/0464; H04N 1/6033; H04N 2201/0082; H04N 2201/0094; H04N 9/3129; H04N 1/00408; H04N 1/00427; H04N 1/00737; H04N 1/3873; H04N 1/4072; H04N 9/3194; H04N 1/00204; H04N 1/00236; H04N 1/00424; H04N 1/00474; H04N 1/00604; H04N 1/00748; H04N 1/00779; H04N 1/00795; H04N 1/02815; H04N 1/0285; H04N 1/0473; H04N 1/1017; H04N 1/1225; H04N 1/32363; H04N 1/32502; H04N 1/32512; H04N 1/32529; H04N 1/32593; H04N 1/32603; H04N 1/33315; H04N 1/33376; H04N 1/3875; H04N 1/603; H04N 1/6041; H04N 1/6083; H04N 13/189; H04N 13/194; H04N 13/204; H04N 13/239;

(Continued)

(56) References Cited

U.S. PATENT DOCUMENTS 9,110,926 B1* 8/2015 Natarajan .......... G06V 30/1478
9,247,077 B2 1/2016 Golding et al.
(Continued)

*Primary Examiner* — Negussie Worku

(57) ABSTRACT

A method is disclosed. For example, the method executed by a processor of a multi-function device (MFD) includes generating an alignment image based on execution of a copy function while an alignment mark is attached to a continuous velocity transport (CVT) platen glass of a CVT of the MFD, determining a misalignment of an illumination profile area, a position of a sensor, and the CVT based on the alignment image, and providing a corrective action to perform an alignment of at least one of the illumination profile area, the position of the sensor, and the CVT via a display of the MFD.

20 Claims, 6 Drawing Sheets

(58) Field of Classification Search
CPC .. H04N 13/286; H04N 13/305; H04N 13/324; H04N 13/327; H04N 13/337; H04N 13/341; H04N 13/361; H04N 13/363; H04N 2201/0039; H04N 2201/0086; H04N 2201/0087; H04N 2201/0089; H04N 1/00103; H04N 1/00129; H04N 1/00161; H04N 1/00167; H04N 1/00241; H04N 1/00283; H04N 1/00413; H04N 1/00519; H04N 1/00713; H04N 1/00721; H04N 1/00769; H04N 1/024; H04N 1/02409; H04N 1/028; H04N 1/0289; H04N 1/047; H04N 1/1215; H04N 1/32128; H04N 1/32358; H04N 1/32561; H04N 1/3871; H04N 1/40093; H04N 1/4074; H04N 2201/006; H04N 2201/02462; H04N 2201/043; H04N 2201/0436; H04N 2201/04703; H04N 2201/3245; H04N 2201/3273; H04N 2201/3278; H04N 2201/3288; H04N 23/56; H04N 9/3161; H04N 9/317; H04N 1/00018; H04N 1/00031; H04N 1/00249; H04N 1/00267; H04N 1/00403; H04N 1/00591; H04N 1/00615; H04N 1/00689; H04N 1/00694; H04N 1/00702; H04N 1/00705; H04N 1/00734; H04N 1/00742; H04N 1/00787; H04N 1/00798; H04N 1/00835; H04N 1/00896; H04N 1/00909; H04N 1/02855; H04N 1/02885; H04N 1/03; H04N 1/0303; H04N 1/0305; H04N 1/042; H04N 1/121; H04N 1/123; H04N 1/32144; H04N 1/32208; H04N 1/32229; H04N 1/32448; H04N 1/32464; H04N 1/3872; H04N 1/4015; H04N 1/52; H04N 2201/0074; H04N 2201/02468; H04N 2201/02483; H04N 2201/02485; H04N 2201/0456
USPC .......................................................... 358/474
See application file for complete search history.

(56) References Cited

U.S. PATENT DOCUMENTS

| | | | |
|---|---|---|---|
| 9,288,359 B2 | 3/2016 | Wilsher et al. | |
| 9,774,755 B1* | 9/2017 | de Echaniz | H04N 1/00819 |
| 2006/0098243 A1* | 5/2006 | Ahmed | H04N 1/00734 |
| | | | 358/474 |
| 2006/0227388 A1* | 10/2006 | Proctor | H04N 1/02835 |
| | | | 358/474 |
| 2009/0323131 A1* | 12/2009 | Toyoda | H04N 1/00705 |
| | | | 358/448 |
| 2010/0111407 A1* | 5/2010 | Hashizume | H04N 1/387 |
| | | | 382/167 |
| 2015/0138611 A1* | 5/2015 | Golding | H04N 1/0005 |
| | | | 358/475 |
| 2015/0304514 A1* | 10/2015 | Sheng | H04N 1/2032 |
| | | | 358/1.6 |
| 2016/0330344 A1* | 11/2016 | Wilsher | H04N 1/1065 |
| 2017/0054863 A1* | 2/2017 | Moore | H04N 1/00413 |
| 2017/0331970 A1* | 11/2017 | Osanai | H04N 1/0032 |
| 2018/0048786 A1* | 2/2018 | Sunada | H04N 1/00718 |
| 2018/0054538 A1* | 2/2018 | de Echaniz | H04N 1/00912 |
| 2019/0273836 A1* | 9/2019 | Akagi | H04N 1/02885 |

* cited by examiner

METHOD AND APPARATUS TO VERIFY IMAGING POSITION ON A MULTI-FUNCTION DEVICE

FIELD OF THE DISCLOSURE

The present disclosure relates generally to scanning optical imaging alignment of multi-function devices (MFDs) and relates more particularly to a method and apparatus to verify imaging position on a multi-function device.

BACKGROUND

Documents can be generated on MFDs. MFDs may have various imaging components that can be used to generate the documents. For example, the MFDs can perform copying, printing and scanning, as well other functions. Some MFDs may perform dual sided scans and single sided scans.

The imaging components may include a light source that can be directed towards a document on a platen glass. The light may be reflected at varying levels of brightness depending on the images on the document on the platen glass. The different levels of reflected light may be measured by a sensor. The measurements from the sensor can then be converted into digital values that can digitally represent the images on the document and determine the location and amount of toner to be dispensed when reproducing the document.

SUMMARY

According to aspects illustrated herein, there are provided a method, a multi-function device, and a non-transitory computer readable medium for verifying imaging position on an MFD. One disclosed feature of the embodiments is a method executed by a processor of the MFD that comprises generating an alignment image based on execution of a copy function while an alignment mark is attached to a continuous velocity transport (CVT) platen glass of a CVT of the MFD, determining a misalignment of an illumination profile area, a position of a sensor, and the CVT based on the alignment image, and providing a corrective action to perform an alignment of at least one of the illumination profile area, the position of the sensor, and the CVT via a display of the MFD.

Another disclosed feature of the embodiments is an MFD that comprises a display, a continuous velocity transport (CVT) comprising a stationary lamp and a CVT platen glass, a platen glass, a movable carriage including a light source and one or more reflectors, a sensor, a processor, and a non-transitory computer readable medium storing instructions executed by the processor to generate an alignment image based on execution of a copy function while an alignment mark is attached to the CVT platen glass, determine a misalignment of an illumination profile area, a position of the sensor, and the CVT based on the alignment image, and provide a corrective action to perform an alignment of at least one of the illumination profile area, the position of the sensor, and the CVT via the display.

Another disclosed feature is a non-transitory computer readable medium storing instructions, which when executed by a processor of a multi-function device (MFD), the instructions cause the processor to generate an alignment image based on execution of a copy function while an alignment mark is attached to a continuous velocity transport (CVT) platen glass of a CVT of the MFD, determine a misalignment of an illumination profile area, a position of a sensor, and the CVT based on the alignment image, and provide a corrective action to perform an alignment of at least one of the illumination profile area, the position of the sensor, and the CVT via a display of the MFD.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to verify imaging position on an MFD. As discussed above, MFDs may have various imaging components that can be used to generate the documents. The imaging components may include a light source that can be directed towards a document on a platen glass. The light may be reflected at varying levels of brightness depending on the images on the document on the platen glass. The different levels of reflected light may be measured by a sensor. The measurements from the sensor can then be converted into digital values that can digitally represent the images on the document and determine the location and amount of toner to be dispensed when reproducing the document.

However, if the imaging components are misaligned, the misalignment can cause defects in the reproduced image. For example, the reproduced image or document may be skewed, off-center, misaligned, low in signal, and the like. The imaging components are aligned when the MFD is manufactured. However, over time, the imaging components may fail and be replaced causing a misalignment, the MFD could be mishandled causing a misalignment, and the like. Once the imaging components become misaligned, it may be difficult and/or complicated to detect the severity of the misalignment and determine the proper corrective action to realign the imaging components.

The present disclosure provides a method and apparatus that provides a comprehensive imaging position verification. For example, the methods of the present disclosure provide a relatively simple method to detect misalignment of the imaging components. The methods disclosed herein can further provide which imaging components are misaligned and how much the imaging components are misaligned to provide a proper corrective action.

Figure 1:
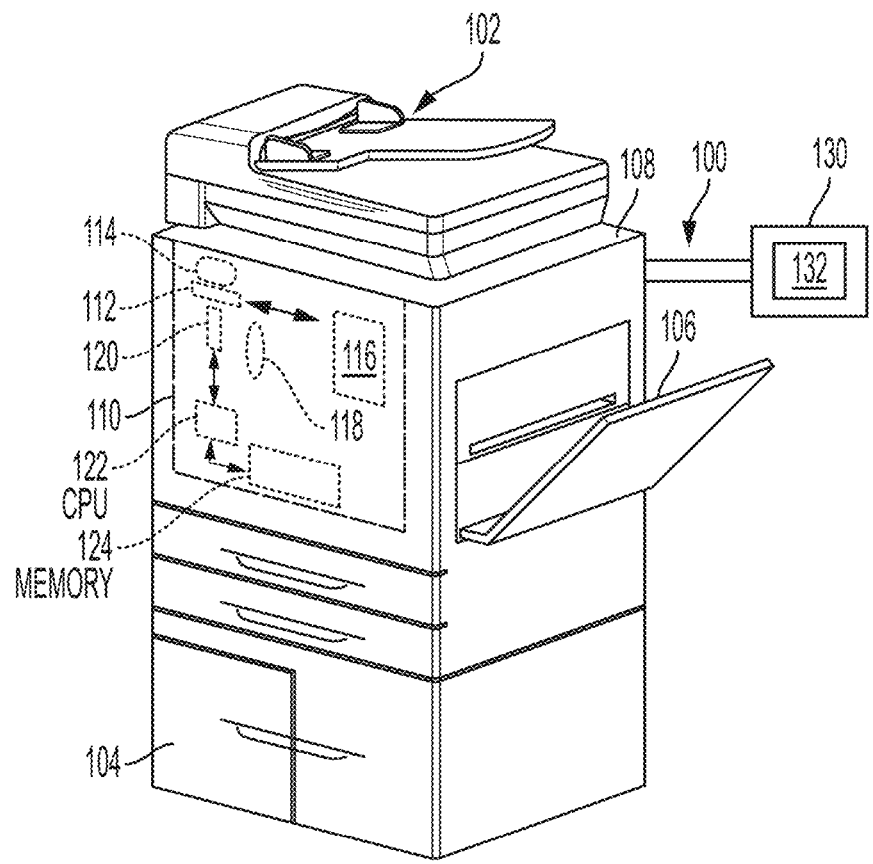
FIG. 1 illustrates an example of a multi-function device (MFD) of the present disclosure.

FIG. 1 illustrates an example of a multi-function device (MFD) 100 in accordance with embodiments of the present disclosure. The MFD 100 has a media supply drawer 104, an output tray 106, a document handler 102, and a display 130. The document handler 102 may also be referred to as a Duplexing Automatic Document Handler (DADH), which moves the image across the continuous velocity transport (CVT) area on the platen where the scanning carriage is imaging.

In one embodiment, the display 130 may present a graphical user interface (GUI). The display 130 may be a touch screen display or may have an input device (e.g., an external mouse or touchpad) to navigate the GUI. The display may present notifications to a user when an imaging position verification is performed, as discussed below. For example, the GUI may present a message that indicates a misalignment is detected and/or present at least one corrective action.

In addition, the MFD 100 has imaging components 110 shown as dashed lines inside of the MFD 100. The imaging components 110 may include a light source 114 (e.g., a lamp, an array of light emitting diodes, a laser, and the like) on a movable carriage 112. The imaging components 110 may further include one or more reflectors 116 that may also be on a movable carriage, optics 118, and a sensor 120.

In one embodiment, the sensor 120 may be a charge coupled device (CCD) sensor and the optics 118 may be a focusing lens. In another embodiment, the sensor 120 may be a full width array or Contact Image Sensor (CIS) sensor without the use of any separate optics 118.

The sensor 120 may be communicatively coupled to a processor (CPU) 122. The processor 122 may be communicatively coupled to a memory 124. The processor 122 may be used to convert the measurement values from the sensor 120 into a digital value, as discussed below, for printing or copying a document. The processor 122 may then control a print fluid or particulate dispenser (e.g., toner or ink) to dispense the appropriate amount of print fluid or particulate on a print media in accordance with the digital values.

In one embodiment, the memory 124 may be a non-transitory computer readable medium. The memory 124 may store instructions that are executed by the processor 122 to perform the functions described herein.

A sheet of media, for example paper, is fed from supply drawer 104 through an internal image forming mechanism (e.g., using the imaging components 110) of the MFD 100 and then fed to output tray 106. Documents can be fed into MFD 100 in a number of ways. For example, a document can be loaded into document handler 102 which, in turn, feeds the document past an image module(s) (described below) located in the document handler to read an image on the document and/or the imaging components 110.

Figure 2:
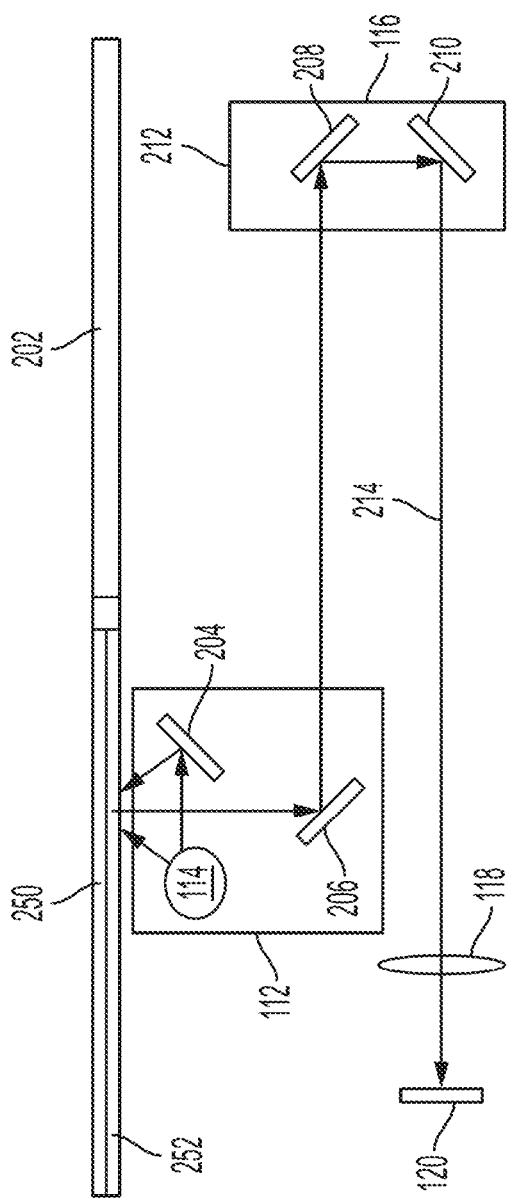
FIG. 2 illustrates a cross-sectional block diagram of the imaging components of the present disclosure.

FIG. 2 illustrates a cross-sectional block diagram of the imaging components 110 of the present disclosure. In one embodiment, the imaging components 110 may be located below a CVT platen glass 250 and a platen glass 202. In an embodiment, the CVT platen glass 250 may also include a clear display 252. For example, the clear display 252 may be a liquid crystal display that is clear when deactivated. However, when activated, the clear display 252 may generate an image (e.g., an alignment mark, as discussed below) to perform the imaging position verification.

In one embodiment, the light source 114 may be placed on the movable carriage 112. The light source 114 may also include a reflector around the light source to direct the light source towards the CVT platen glass 250 or the platen glass 202 where a document is placed. The movable carriage 112 may also include a reflector 204 and/or a mirror 206.

The imaging components 110 may further include the one or more reflectors 116 that are located on a half rate carriage 212 that includes mirrors or reflectors 208 and 210. The movable carriage 112 may move left and right across the page, while the half rate carriage may move up and down along the page.

The imaging components 110 may further include an optic 118 and a sensor 120. The sensor 120 may be a photoelectric sensor that can detect various light levels and intensity of light rays 214. For example, the light source 114 may emit light towards the platen glass 202. Light may be reflected at varying levels based on images on the document facing down on the platen glass 202 and reflected back towards the sensor 120. The sensor may then convert the light levels (e.g., intensity or brightness) into a digital value.

In one embodiment, the sensor 120 may be a charged couple device (CCD) sensor that is used with the optic 118. The optic 118 may be a focusing lens that may reduce a width of the light rays 214 across a width of the platen glass 202 to a smaller width associated with the CCD. In other examples, the optic 118 may be removed if a full width array photoelectric sensor is deployed.

Figure 3:
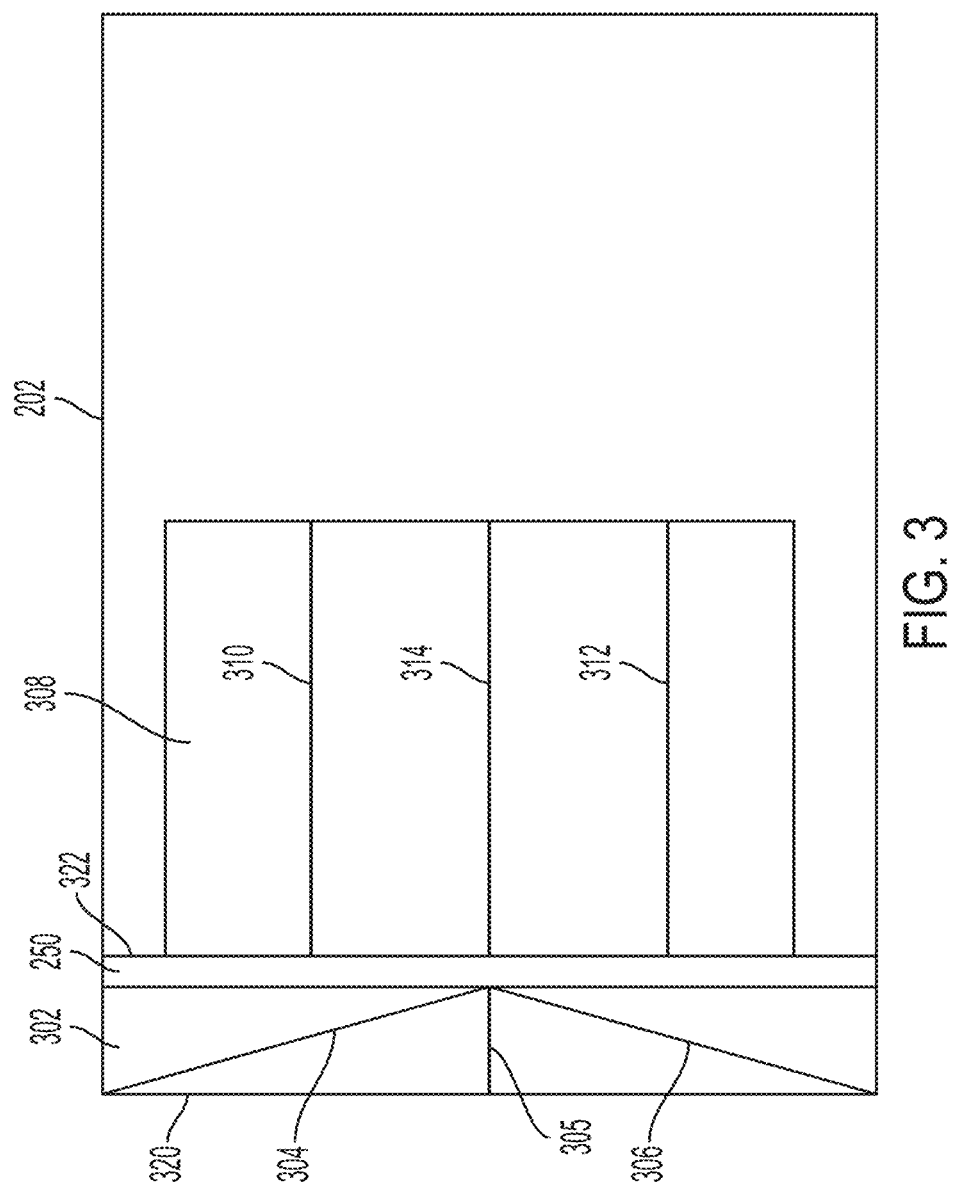
FIG. 3 illustrates a top view of an example of an alignment mark and an alignment image that is generated of the present disclosure.

FIG. 3 illustrates a top view of an example of an alignment mark 302 and an alignment image 308 that is generated by the present disclosure. In one embodiment, the alignment mark 302 may be printed out onto a substrate and coupled to the CVT platen glass 250. For example, the substrate with the alignment mark 302 may be taped or temporarily adhered to the CVT platen glass 250. Notably, the alignment mark 302 would be adhered to the CVT platen glass 250 such that the alignment mark 302 faces the platen glass 202 of the MFD 100.

In another example, the alignment mark 302 may be generated by the clear display 252. For example, when a verification process is performed, the clear display 252 may be activated to generate the alignment mark 302.

The alignment mark 302 may be any geometric shape that can be used to detect the position and skew of the sensor 120. In one embodiment, the alignment mark 302 may be a chevron. For example, the chevron may include a first line 304 that begins on a top corner on a left side 320 of the CVT platen glass 250 and is angled towards a center of a right side 322 of the CVT platen glass 250. A second line 306 may begin from a bottom corner on the left side 320 and angled towards the center of the right side 322. The ends of the first line 304 and the second line 306 may meet at the center of the right side 322 of the CVT platen glass 250. The alignment mark 302 may also include a central horizontal line 305 that runs from a center of the left side 320 to a center of the right side 322.

However, it should be noted that the alignment mark 302 may not necessarily be a chevron. For example, the first line 304 and the second line 306 may be angled, but not meet at the center of the right side 322 of the CVT platen glass 250. For example, the ends of the first line 304 and the second line 306 may be disconnected or separated and touch different points along the right side 322 of the CVT platen glass 250 but still traversing the whole expected imaging area. In some embodiments it may be possible to position these marks outside the paper area but in the sensor imaging area, enabling the marks to be permanently etched on the CVT platen glass 250. This may give slightly reduced accuracy due to the shallower angle and lack of the central horizontal line 305.

In an example, where the alignment mark 302 is a chevron shape with a central horizontal line 305, a copy function may be executed where a print media is fed through the document handler 102. The print media enter from the left side 320 and exit the document handler 102 through the right side 322. The chevron forms a stationary image and hence a dark image where the lines cross the sensor imaging position. Thus, the alignment mark 302 may cause lines 310, 312, and 314 to be generated on the print media when the copy function is executed to generate the alignment image 308. The line 314 may be a center line. The lines 310 and 312 may be located on opposite sides of the line 314. Positioning the line 314 against the line 304 improves the assessment over and above just the distance between the lines 310 and 312.

A distance between the line 310 and the line 314 and a distance between the line 312 and the line 314 may indicate an alignment of the sensor 120. For example, if the distance between the line 310 and the line 314 and the distance between the line 312 and 314 are the same, then the sensor may be aligned vertically without skew. However, if the distance between the line 310 and the line 314 and the distance between the line 312 and 314 are different, then the different distances may indicate the sensor 120 is skewed.

The alignment image 308 may then be used to annotate the alignment mark 302. An annotated version 402 of an alignment mark 450 is illustrated in FIG. 4.

Figure 4:
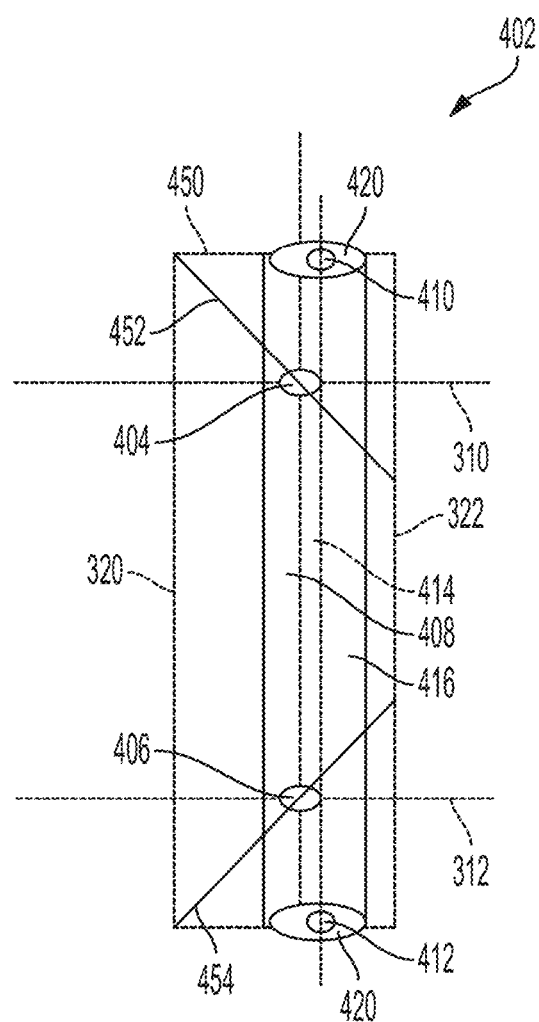
FIG. 4 illustrates a top view of an example of an annotated version of the alignment mark of the present disclosure.

FIG. 4 illustrates the use of the alignment mark 450 where a first line 452 and a second line 454 are angled such that they do not connect towards a center of the right side 322 of the CVT platen glass 250. In other words, the first line 452 and the second line 454 may be angled similar to the first line 304 and the second line 306, but the ends towards the right side 322 may be separated or disconnected.

Regardless of whether the alignment mark 302 or the alignment mark 450 is used, the alignment image 308 may be used to generate an annotated version 402. The alignment image 308 is used to generate marks 404 and 406 and a sensor alignment line 408. For example, the mark 404 may be placed where the horizontal band 310 on the alignment image 308 crosses the first line 450. The second mark 406 may be placed where the horizontal band 312 on the alignment image 308 crosses the second line 454. The sensor alignment line 408 may be drawn between the two marks 404 and 406.

The sensor alignment line 408 may indicate a position of the sensor 120 within an illumination profile area 416 (as discussed below). The sensor alignment line 408 may also indicate if any skew is detected in the sensor 120 (e.g., the sensor 120 is out of position or slightly tilted or angled).

In one embodiment, the annotated version 402 may also include a DADH backer alignment line 414. The backer alignment line 414 may be generated by placing a small amount of a marker 420 (e.g., putty, removable ink, and the like) on opposite ends of the CVT platen glass 250. The document handler 102 may be closed and the backer footings may create impressions 410 and 412 in the marker 420. The backer alignment line 414 may be drawn on the annotated version 402.

Lastly, the illumination profile area 416 may be defined on the annotated version 402 of the alignment mark 302 or 450. For example, the illumination profile area 416 may be detected by activating the lamp 114 while stationary within the CVT platen glass 250. The illumination profile area 416 may be an area where the light source 114 maintains a maximum intensity before a fall off on either side of the light intensity profile.

For example, an illumination profile of the light source 114 may be measured as light intensity vs position. The light intensity may be measured from a center of the light source 114 and then a distance away from the center in both the left and right direction. The light intensity may have a maximum value near the center and fall off the further the light intensity is measured away from the center. The illumination profile may have a plateau shape where near the center the light intensity is near the maximum and then a sharp fall off is detected. For example, the fall off may be defined as when the light intensity falls more than 3% from the maximum intensity. Different light sources may have different illumination profiles. The illumination profile for each light source may be pre-defined. However, where the illumination profile area 416 is located may be annotated on the annotated version 402 of the alignment mark 302 or 450.

Thus, annotated version 402 may provide positioning information related to the sensor 120, the backer of the document handler 102, and the light source 114. In a perfect alignment, the illumination profile area 416 should be located in a central area of the CVT platen glass 250, as prescribed by the scanner design of the particular model of the MFD 100. The sensor alignment line 408 and the backer alignment line 414 should be on top of one another and located in a center of the illumination profile area 416.

The annotated version 402 may indicate if one or more of the imaging components 110 and/or the document handler 102 is misaligned or out of position. For example, if the illumination profile area 416 is too close to the left side 320 or the right side 322, the position of the light source 114 or the movable carriage 112 may be adjusted.

In another example, the sensor alignment line 408 may be crooked. In other words, the sensor alignment line 408 should be perfectly vertical. Said another way, the sensor alignment line 408 should be parallel to the left side 320 and/or the right side 322 of the CVT platen glass 250. If the sensor alignment line 408 is crooked or angled, the sensor 120 may be skewed. Thus, an adjustment to the sensor 120 and/or the optic 118 may be made to adjust the skew.

In another example, the sensor alignment line 408 may be off-center in the illumination profile 416 or misaligned with the backer alignment line 414. This may indicate that the sensor 120 is out of position or alignment. Thus, the position of the sensor 120 and/or the optic 118 may be adjusted.

In another example, the backer alignment line 414 may be off-center in the illumination profile 416 or misaligned with the sensor alignment line 408. This may indicate that the backer or document handler 102 is out of position. Thus, the position of the backer or the document handler 102 may be adjusted.

In one embodiment, the alignment of the illumination profile area 416, the sensor alignment line 408, and the backer alignment line 414 may be measured relative to a respective threshold. For example, the illumination profile area 416 may be off-center when the center of the illumination profile area 416 and a center of the CVT platen glass 250 is off by greater than a few millimeters (mm) (e.g., greater than 1 mm, greater than 3 mm, and the like). In one embodiment, the alignment of the sensor alignment line 408 and the backer alignment line 414 may be considered to be misaligned if off of the center of the illumination profile area 416 by greater than 1 mm, 2, mm, 5 mm, and the like. The alignment of the sensor alignment line 408 and the backer alignment line 414 may be considered to be misaligned if the two lines are separated by more than 1 mm, 2 mm, 5 mm, and the like. In one embodiment, the sensor alignment line 408 may be considered to be skewed if the line is angled relative to the left side 320 or the right side 322 by more than 1 degree, 2, degrees, 5 degrees, and the like.

Thus, the annotated version 402 may provide a large amount of alignment information for the imagining components 110 and/or the document handler 102. In one embodiment, a technician may then make appropriate adjustments to realign the sensor 120, the lamp 114, the movable carriage 112, and/or the document handler 102. The process may then be repeated to generate an updated annotated version 402 of the alignment mark 302 or 450 until the illumination profile area 416, the sensor alignment line 408, and the backer alignment line 414 are aligned within the respective alignment thresholds.

In one embodiment, the MFD 100 may generate a copy of the annotated version 402 or scan the annotated version 402. In one embodiment, the clear display 252 may generate an electronic image of the annotated version 402. The copy may be scanned by the MFD 100 and analyzed, or the MFD 100 may analyze the electronic image generated by the clear display 252.

MFD 100 may store a database of known corrective actions based on the misalignments detected in the annotated version 402 of the alignment mark 302 or 450. The corrective actions may be based on misalignment of the illumination profile area 416, the sensor alignment line 408, or the backer alignment line 414 and an amount of the misalignment. The corrective action may also be based on how much skew is detected in the sensor alignment line 408.

The corrective actions may be presented on the display 130 in the GUI 132. For example, the corrective actions may indicate what misalignment or skew was detected and what component should be adjusted. The display GUI 132 may provide a video and/or step-by-step directions on how the corrective actions can be performed.

In another embodiment, the MFD 100 may transmit an alarm to other networked MFDs 100. For example, if the MFD 100 is a particular model or serial number experiencing a misalignment over time, other MFDs 100 may also be experiencing the same misalignment. Thus, the MFD 100 may include a network interface (e.g., wired or wireless communication interface) may transmit an alarm to other MFDs 100 with the same model number of serial number to notify the user's to perform the imaging position verification to ensure that the imaging components and/or document handlers are not misaligned.

In one embodiment, the MFDs 100 may be managed by a server of a service provider. The alarm may be transmitted to a server in a network and the server may then transmit the notification or alarm to other MFDs 100 with the same model number of serial number that the service provider knows are deployed in the network.

Figure 5:
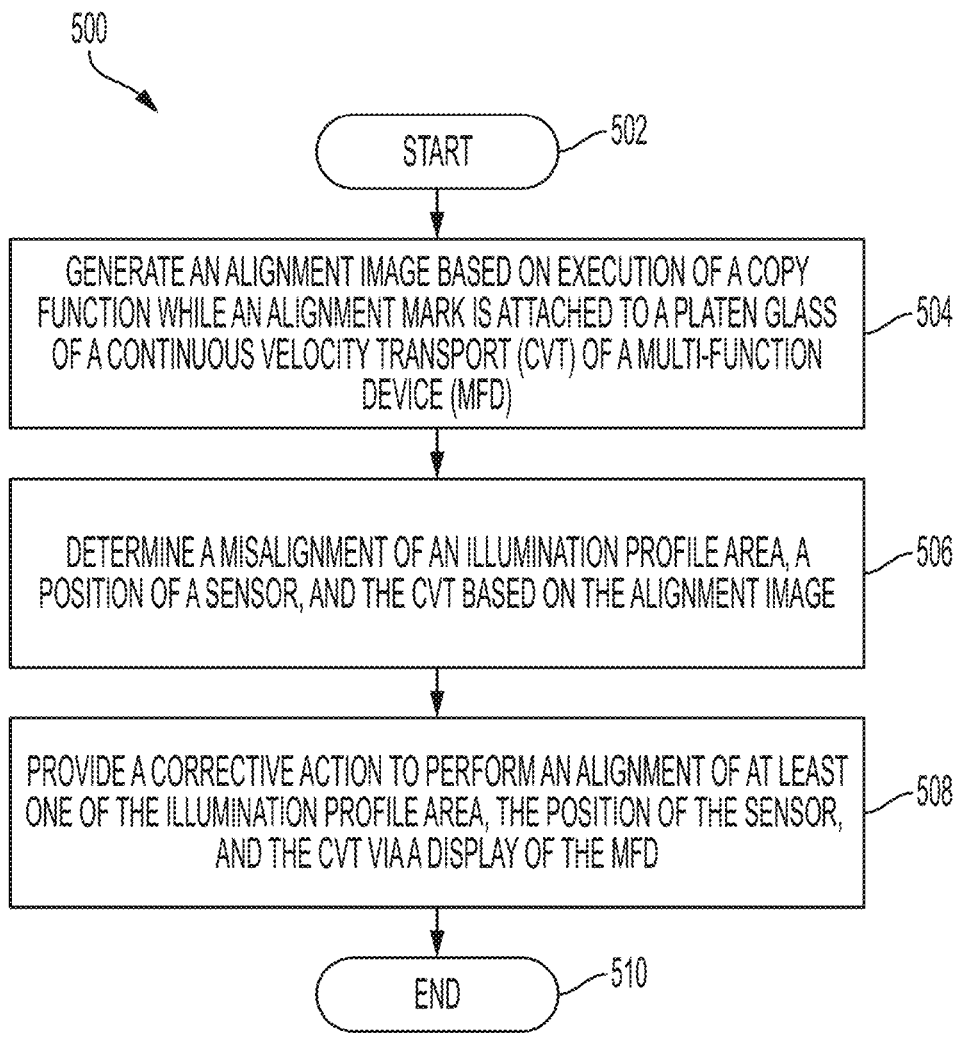
FIG. 5 illustrates a flow chart for a method of verifying imaging position on an MFD of the present disclosure.

FIG. 5 illustrates a flow chart of an example method 500 for accessing a document associated with an encrypted code of the present disclosure. In one embodiment, the method 500 may be performed by the MFD 100 or by an apparatus such as the apparatus 600 illustrated in FIG. 6 and discussed below.

In one embodiment, the method 500 begins at block 502. At block 504, the method 500 generates an alignment image based on execution of a copy function while an alignment mark is attached to a platen glass of a continuous velocity transport (CVT) of the MFD. As illustrated in FIG. 3, and discussed above, the alignment mark may be a chevron or any other type of image that has two angled lines that can be used to detect skew and position of a sensor of the MFD.

In one embodiment the alignment mark may be printed on to paper, substrate, or any other type of print media, and then adhered to the CVT platen glass. The alignment mark may be facing down on the CVT platen glass of the MFD. In another embodiment, a clear display may be coupled to the CVT platen glass to generate the alignment mark in response to activation of an imaging position verification process.

When the copy function is executed with the alignment mark, the alignment image may include at least two horizontal bands. In one embodiment, when a chevron is used, the alignment image may also include a center line.

At block 506, the method 500 determines a misalignment of an illumination profile area, a position of a sensor, and the CVT based on the alignment image. For example, the alignment image may then be used to annotate the alignment mark. For example, using the horizontal bands from the alignment image, the alignment mark may be annotated with marks where the horizontal bands intersect the lines of the alignment mark. A vertical sensor alignment line may be drawn between the two marks.

In addition, a backer alignment line may be drawn between the two backer footings of the document handler. For example, a marker (e.g., putty or removable ink) may be placed on opposing sides of the CVT platen glass. When the document handler is closed, the backer footings may leave an impression on the marker. The DADH backer alignment line may be drawn between the two impressions to indicate a position of the DADH backer/document handler.

Furthermore, the alignment mark may be annotated with the illumination profile area. The illumination profile area may indicate where the illumination profile area is located on the CVT platen glass.

After the alignment mark is annotated, the annotated version of the alignment mark may be scanned. The scanned image may be from a copy of the annotated version or an electronic image generated by a clear display coupled to the CVT platen glass. The image may then be analyzed to determine which imaging components are misaligned or skewed.

At block 508, the method 500 provides a corrective action to perform an alignment of at least one of the illumination profile area, the position of the sensor, and the CVT via a display of the MFD. The corrective action may be provided on a display of the MFD. The corrective action may include step-by-step instructions on how to perform the corrective actions to fix the misaligned or skewed imagining components based on analysis of the annotated version of the alignment mark. In another embodiment, the corrective action may be provided as a video on the GUI of the display of MFD.

In one embodiment, some of the mechanical components may be electrically coupled to a motor and the processor of the MFD. As a result, some corrective action may be automatically performed by the MFD. For example, the movable carriage may be automatically moved within a small tolerance to try and align the light source. For example the stationary scanning position and illumination can be moved left/right across the CVT to centralize better to the DADH backer and CVT area, this is normally done by a setting value inside the MFP. In another example, the sensor may also be placed on a movable carriage to slight adjust the position of the sensor. In other embodiments, a technician may manual adjust one or more of the imaging components in accordance with the corrective actions that are displayed.

In one embodiment, the method 500 may be repeated. For example, after the corrective actions are executed, the blocks 504 and 506 may be repeated until a misalignment is not detected. At block 510, the method 500 ends.

Figure 6:
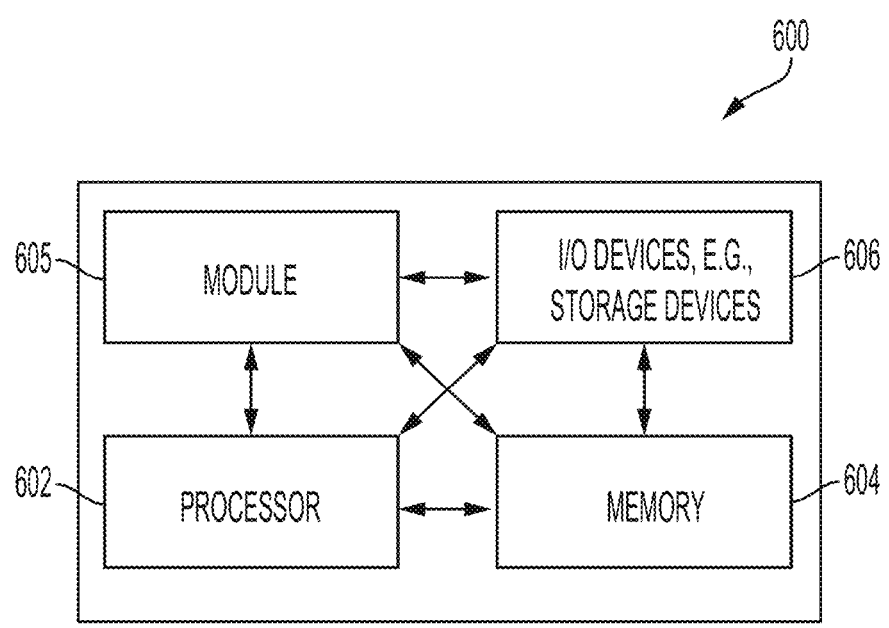
FIG. 6 illustrates a high-level block diagram of an example computer suitable for use in performing the functions described herein.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for verifying imaging position on an MFD, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for verifying imaging position on an MFD (e.g., a software program comprising computer-executable instructions) can be loaded into memory 604 and executed by hardware processor element 602 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for verifying imaging position on an MFD (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
   generating, by a processor of a multi-function device (MFD), an alignment image based on execution of a copy function while an alignment mark is attached to a continuous velocity transport (CVT) platen glass of a CVT of the MFD;
   determining, by the processor, a misalignment of at least one of: an illumination profile area, a position of a sensor, or the CVT based on the alignment image; and
   providing, by the processor, a corrective action to perform an alignment of at least one of: the illumination profile area, the position of the sensor, or the CVT via a display of the MFD.

2. The method of claim 1, wherein the alignment mark comprises opposing markings to detect skew of the position of the sensor.

3. The method of claim 2, wherein a first marking of the opposing markings is angled from a top left corner towards a right center and a second marking of the opposing markings is angled from a bottom left corner towards the right center.

4. The method of claim 2, wherein the alignment mark comprises a chevron.

5. The method of claim 2, wherein the alignment image comprises lines across a width of a substrate.

6. The method of claim 5, wherein the determining, comprises:
   scanning, by the processor, an annotated version of the alignment mark that includes a first line that runs through opposing marks where the lines intersect the opposing marks, a second line indicating a location of duplexing automatic document handler (DADH) backer footings of the CVT, and the illumination profile area; and
   detecting, by the processor, the first line and the second line are offset by greater than a first threshold and that the first line and the second line are off of a center of the illumination profile area by greater than a second threshold.

7. The method of claim 6, wherein the location of the DADH backer footings is determined by placing a marker along outer edges of the platen glass of the CVT and closing the CVT to allow the DADH backer footings to leave an impression on the marker.

8. The method of claim 1, wherein the alignment mark is printed on a substrate and coupled to the CVT platen glass.

9. The method of claim 1, wherein the alignment mark is generated via a clear display coupled to the CVT platen glass.

10. A multi-function device (MFD), comprising:
    a display;
    a continuous velocity transport (CVT), comprising:
      a stationary lamp; and
      a CVT platen glass;
    a platen glass;
    a movable carriage including a light source and one or more reflectors;
    a sensor;
    a processor; and
    a non-transitory computer readable medium storing instructions executed by the processor to:
      generate an alignment image based on execution of a copy function while an alignment mark is attached to the CVT platen glass;
      determine a misalignment of at least one of: an illumination profile area, a position of the sensor, or the CVT based on the alignment image; and
      provide a corrective action to perform an alignment of at least one of: the illumination profile area, the position of the sensor, or the CVT via the display.

11. The MFD of claim 10, wherein the alignment mark comprises opposing markings to detect skew of the position of the sensor.

12. The MFD of claim 11, wherein a first marking of the opposing markings is angled from a top left corner towards a right center and a second marking of the opposing markings is angled from a bottom left corner towards the right center.

13. The MFD of claim 11, wherein the alignment mark comprises a chevron.

14. The MFD of claim 11, wherein the alignment image comprises lines across a width of a substrate.

15. The MFD of claim 14, wherein the processor to determine, further comprises instructions to cause the processor to:
   scan an annotated version of the alignment mark that includes a first line that runs through opposing marks where the lines intersect the opposing marks, a second line indicating a location of duplexing automatic document handler (DADH) backer footings of the CVT, and the illumination profile area; and
   detect the first line and the second line are offset by greater than a first threshold and that the first line and the second line are off of a center of the illumination profile area by greater than a second threshold.

16. The MFD of claim 10, wherein the alignment mark is printed on a substrate and coupled to the CVT platen glass.

17. The MFD of claim 10, further comprising:
   a clear display coupled to the CVT platen glass to generate the alignment mark.

18. A non-transitory computer readable medium storing instructions, which when executed by a processor of a multi-function device (MFD), the instructions cause the processor to:
   generate an alignment image based on execution of a copy function while an alignment mark is attached to a continuous velocity transport (CVT) platen glass of a CVT of the MFD;
   determine a misalignment of at least one of: an illumination profile area, a position of a sensor, or the CVT based on the alignment image; and
   provide a corrective action to perform an alignment of at least one of; the illumination profile area, the position of the sensor, or the CVT via a display of the MFD.

19. The non-transitory computer readable medium of claim 18, wherein the alignment mark comprises a chevron.

20. The non-transitory computer readable medium of claim 18, wherein the processor to determine further comprises the processor to:
   scan an annotated version of the alignment mark that includes a first line that runs through opposing marks where the lines intersect the opposing marks, a second line indicating a location of duplexing automatic document handler (DADH) backer footings of the CVT, and the illumination profile area; and
   detect the first line and the second line are offset by greater than a first threshold and that the first line and the second line are off of a center of the illumination profile area by greater than a second threshold.

* * * * *